United States Patent
Lockwood

(10) Patent No.: US 7,445,807 B2
(45) Date of Patent: Nov. 4, 2008

(54) AGGLOMERATED GRANULAR PROTEIN-RICH NUTRITIONAL SUPPLEMENT

(75) Inventor: Christopher Lockwood, Draper, UT (US)

(73) Assignee: Western Holdings, LLC, Casper, WY (US)

( * ) Notice: Subject to any disclaimer, the term of this patent is extended or adjusted under 35 U.S.C. 154(b) by 67 days.

(21) Appl. No.: 10/271,239

(22) Filed: Oct. 15, 2002

(65) Prior Publication Data

US 2004/0071825 A1 Apr. 15, 2004

(51) Int. Cl.
*A23J 1/00* (2006.01)

(52) U.S. Cl. ............... 426/656; 426/96; 426/601; 426/658; 426/661; 426/657

(58) Field of Classification Search .......... 426/656, 426/96, 601, 658, 661, 657
See application file for complete search history.

(56) References Cited

U.S. PATENT DOCUMENTS

| | | | |
|---|---|---|---|
| 2,985,562 A * | 5/1961 | Millard et al. ............. 424/44 |
| 4,356,198 A * | 10/1982 | Parada et al. ............. 426/96 |
| 4,737,364 A | 4/1988 | Kalogris |
| 4,861,605 A | 8/1989 | Moon et al. |
| 5,494,678 A * | 2/1996 | Paradissis et al. ......... 424/439 |
| 5,514,666 A | 5/1996 | Cerda et al. |
| 5,543,153 A * | 8/1996 | Walton ................ 424/466 |
| 5,556,644 A | 9/1996 | Chandra |
| 5,560,928 A * | 10/1996 | DeFelice ............... 424/466 |
| 5,654,011 A | 8/1997 | Jackson et al. |
| 5,766,636 A | 6/1998 | Turk et al. |
| 5,780,039 A | 7/1998 | Greenberg et al. |
| 5,916,612 A * | 6/1999 | Bonnasse et al. ........... 426/96 |
| 5,925,378 A * | 7/1999 | Carnazzo ............... 424/466 |
| 6,241,996 B1 | 6/2001 | Hahn |
| 6,254,904 B1 | 7/2001 | Bailey |
| 2001/0006677 A1 * | 7/2001 | McGinity et al. ......... 424/449 |
| 2002/0071868 A1 * | 6/2002 | Jia ....................... 424/486 |
| 2003/0039736 A1 * | 2/2003 | Lefebvre et al. .......... 426/564 |
| 2003/0077306 A1 * | 4/2003 | Pather et al. ............ 424/400 |

FOREIGN PATENT DOCUMENTS

JP 410136937 * 5/1998

* cited by examiner

*Primary Examiner*—Anthony Weier
(74) *Attorney, Agent, or Firm*—Holme Roberts & Owen LLP

(57) ABSTRACT

A agglomerated granular protein-rich nutritional supplement includes a mixture of one or more of: edible nutritional food proteins; edible carbohydrates; edible fats; edible dietary vitamins and minerals; edible amino acids; and edible plant extracts, where the nutritional supplement is agglomerated and granulated in an oral unit dosage form that is directly absorbable onto the tongue or rapidly dissolvable in an aqueous liquid. Specific formulations of the supplement are shown, for use by specific groups of individuals. Also shown are methods of supplementing the nutritional intake of various individuals engaged in various activities having various needs by orally administering a formulation of the protein-rich nutritional supplement. The nutritional supplement is in an oral unit dosage form of either agglomerated granules or a rapidly dissolvable wafer and may include a flavoring compound and an effervescing compound.

29 Claims, No Drawings

AGGLOMERATED GRANULAR PROTEIN-RICH NUTRITIONAL SUPPLEMENT

FIELD OF THE INVENTION

The present invention relates to nutritional supplements, and more particularly relates to novel agglomerated granular protein-rich nutritional supplements able to be absorbed directly onto the tongue or rapidly dissolved in aqueous liquids, as well as methods for supplementing the nutritional needs of individuals of various ages, genders, and levels of activity.

BACKGROUND OF THE INVENTION

The use of nutritional supplements to supplement the nutritional needs of humans is known. It is recognized that the vitamins, minerals and other substances found in such supplements play important physiological roles, and that a deficiency of certain vitamins, minerals and/or other substances has been linked to the etiology of certain diseases. Conversely, the presence of certain of these substances is known to enhance a variety of physiological states, under various conditions. It is particularly known, as well, that certain subgroups of individuals, i.e., children, women, older adults, persons engaging in strenuous physical exercise, have specific nutritional needs not necessarily corresponding to those of the general adult population, or to each other.

The nutritional and health needs of women are known to differ in many respects from those of men. The health conditions which may develop during a woman's life include coronary heart disease, certain cancers, cervical dysplasia, menopause, and pre-menstrual syndrome. Menopausal symptoms in women can manifest themselves with varying degrees of severity. Perimenopausal women are susceptible to hot flashes. Postmenopausal women are particularly susceptible to osteoporosis.

The nutritional needs of older adults also are known to differ from those of younger adults (i.e., fifty years of age and under) in several respects. Aging is generally associated with impaired immune responses.

In addition, the nutritional and health needs of children are known to differ in many respects from those of adults. It is recognized, as well, that dietary imbalance causes physiological disorders in children, including, but not limited to, hyperactivity, hyperkinesis, and learning disabilities. It is known, for example, that hyperactivity and certain learning disorders can be treated by orthomolecular therapy, which involves regulating the concentration of particular substances (vitamins, minerals, trace elements, hormones, amino acids, enzymes) normally present in the human body.

Bodybuilders and persons engaged in strenuous physical exercise also have particular nutritional requirements, whether to decrease body fat, increase lean muscle mass, improve glucose metabolism, or merely to promote rapid recovery following aerobic and/or anaerobic exercise.

The edible dietary B and B-complex vitamins perform several well-known functions. Vitamin $B_1$, thiamin, helps maintain smooth muscle and helps in the formation of blood cells. It is necessary, also, for proper nervous system function. Vitamin $B_2$, riboflavin, is necessary for healthy hair, nails and mucous membranes. It also plays an important role in the formation of red blood cells and the production of antibodies. Vitamin $B_3$, niacin, helps in the production of most sex hormones, and also helps to lower cholesterol and maintain blood circulation. Vitamin $B_6$, pyridoxine, is involved in the synthesis of RNA and DNA, and helps relieve water retention in women. Folic acid is essential to the production of red blood cells and hormones, and is involved, as well, in DNA synthesis. Vitamin $B_{12}$, cyanocobalamin, is necessary for overall metabolism and nervous system function, and is essential for the metabolism of folic acid. It also is necessary to prevent anemia. Biotin is necessary for the metabolism of proteins, carbohydrates and fats, as well as for healthy hair and skin. Vitamin $B_5$, pantothenic acid, is important for the production of adrenal gland hormones. It is referred to as the "anti-stress vitamin." Choline is necessary for nervous system and brain function, and is important in gall bladder and liver function. Inositol helps remove fats from arteries and from the liver, and has been noted to be necessary for brain function. Inzitol®, which is a form of D-pinitol for use in dietary supplements and manufactured by Humanetics Corporation, of St. Louis Park, Minn., supports glucose metabolism by acting as a mediator of insulin action, promoting insulin sensitivity. Para-amino benzoic acid ("PABA") aids in the metabolism of proteins and in the production of red blood cells.

Other edible dietary vitamins exhibit other functions. Vitamin C has antioxidant properties. It is necessary for collagen synthesis, and has been shown to reduce the risk of heart disease, as well as reducing cervical epithelial abnormalities. Vitamin A prevents night blindness and other disorders, reduces the risk of lung cancer, and negates the effects of sun damage. It also possesses antioxidant properties. Vitamin D assists in the mineralization and calcification of bone, prevents osteomalacia in adults, and lowers the blood pressure. Vitamin E, along with exhibiting antioxidant properties, helps reduce the risk of lung cancer and heart disease. It also has been linked to the relief of "hot flashes" and mastodynia. Folic acid is essential to the production of red blood cells and hormones, and also aids in the formation and function of white blood cells. It also serves as a coenzyme in DNA and RNA synthesis, and thus is essential to healthy cell division and replication.

Edible amino acids and their analogs and derivatives also present physiological effects. Alanine is required for the metabolism of glucose and tryptophan. Arginine ketoisocaproate (AKIC) prevents muscle breakdown, supports brain activity, and assists in intestine repair. Asparagine is used to help maintain equilibrium. It also is required for amino acid transformation in the liver. Ornithine alpha ketoglutarate (OKG) has been shown to improve protein retention, wound repair and immune function. OKG also improves performance in hypercatabolic states associated with such activities as vigorous sports and weightlifting. Leucine assists with regulation of blood glucose levels and the growth and repair of muscle tissue. Isoleucine promotes muscle recovery after physical exercise, and is required for the formation of hemoglobin. Phosphatidylserine (PS) has applications relating to stress damage, seasonal depression, exercise recovery, immune stimulation, and memory loss. It has been shown to decrease cortisol levels, and improve mental acuity. Valine is needed for muscle metabolism, repair and growth of tissue, and maintaining nitrogen balance. Tyrosine stimulates the release of growth hormone, which causes muscle growth and reduced body fat. Glutamine helps brain function as it quickly converts to glucose. A growth hormone releaser, it improves exercise endurance. Phenylalanine is used to produce norepinephrine, and functions as an antidepressant and memory boost. Glutamine peptide, an enzymatically altered protein, has been shown to strengthen muscles. It is recommended for improved immune systems response and glycogen replenishment, particularly after exercise. 4-hydroxyisoleucine, extracted from fenugreek seed, accelerates the storage of creatine. Taurine, found naturally in breast milk, plays a significant role in brain and retinal development, as well as retinal function. Phosphatidylcholine (PC, or lecithin), taken prior to activity, prevents the decline of choline levels and improves performance. Covalently-bound zinc/magnesium aspartate (ZMA) enhances muscle strength, and is used in strength training programs. S-adenosyl-methionine (SAM-e) is a cofactor for methylation, and assists in hormone regulation and cell membrane synthesis. SAM-e also contributes to the synthesis of glutathione, essential for proper liver function. Pyroglutamic acid is associated with acetylcholine activity, and the production of the neurotransmitters GABA and glycine. Beta-hydroxy-beta-methylbutyrate (HMB), derived from leucine, is used as a supplement by bodybuilders and others trying to increase lean muscle mass.

Edible nutritional proteins and their derivatives provide specific benefits. Whey protein isolate (WPI) and milk protein isolate (MPI) have been shown effective with bodybuilders in rapidly gaining lean muscle mass while reducing body fat. WPI also has been shown to provide a smooth and pleasant mouth feel, in contrast to, e.g., soy protein isolate. WPI is high in branched-chain amino acids. MPI is primarily casein, shown effective in promoting muscle growth. Egg protein (albumen) also is high in amino acid content. Whey protein hydrosylate (WPH) has been linked to improved nitrogen retention and growth in rats. Soy protein isolate has been shown to minimize thyroid suppression, and thus is beneficial in a fat-loss program.

The nutritional physiologic effects of various edible plant extracts also are well-known. Beta carotene converts into Vitamin A for use as needed. It boosts the immune system by absorbing free radicals. It also helps reduce the risk of stroke, heart disease and many yeast infections. Caffeine has been used to treat migraine headaches and relieve (short-term) fatigue. It also increases the ability of the body to burn fat by helping liberate fatty acids from fat stores. Colosolic acid stabilizes blood glucose levels. Choline metabolizes fats and is used to treat, inter alia, arteriosclerosis and forgetfulness. Hydroxycitrate (HCA) inhibits lipogenesis, and is a well-established "fat burning" agent.

Yohimbine, from the Yohimbe tree, is used to treat impotence and a lack of libido, as well as Parkinson's disease. *Mucuna pruriens*, also known as velvet bean or cowitch, is efficacious in the management of Parkinson's disease by virtue of its L-Dopa content. It is recognized as an aphrodisiac, and has been shown to improve mental alertness and coordination. Dong quai, considered the ultimate, all-purpose woman's tonic herb, is used to treat almost every gynecological complaint. It is useful by men and women as a blood tonic, and contains vitamins A, E and $B_{12}$. Cranberry extract helps maintain urinary tract health, and promotes cardiovascular and cellular health. Evening primrose oil is a rich source of omega-6 oils, used in the synthesis of prostaglandins. Evening primrose oil also is rich in gamma-linolenic acid (GLA), which has been shown to inhibit platelet aggregation and reduce blood pressure. Black cohosh, *Cimicifuga racemosa*, is used in the treatment of menopause, selectively and significantly reducing levels of luteinizing hormone.

Several edible dietary minerals have also exhibited beneficial effects. Calcium builds bones and teeth, and is necessary for proper cardiac rhythms and for the conduction of nerve impulses. Iodine helps to metabolize fats, and is necessary for proper thyroid function. It also reduces fibrocystic breast conditions. Magnesium is involved in several enzymatic reactions in the body, and has been found beneficial in the treatment of cardiac arrhythmias and the management of diabetes. Increased intake of magnesium may aid in the prevention of osteoporosis. Magnesium also helps prevent bone loss and is used, as well, in managing diabetes. Selenium possesses antioxidant properties, and has been shown to reduce the risk of heart attack and heart disease. Manganese is involved in protein synthesis and central nervous system function, assists in bone growth, and helps prevent osteoporosis. It also regulates the production and release of insulin, assists in the metabolism of fats and proteins, and assists in the production of milk, as well as the thyroid hormone thyroxin. Chromium deficiency has been linked to weight loss and glucose intolerance, as well as to peripheral neuropathy. Chromium also helps lower LDL (low density lipoprotein) and raise HDL (high density lipoprotein) levels, and may protect against coronary artery disease. Molybdenum plays a biochemical role in enzyme function. It also helps metabolize fats, and plays a role in iron utilization. Boron is used to maintain healthy bones, and allows for increased absorption of calcium, magnesium and phosphorus. Potassium is necessary for proper fluid balance, as well as proper heartbeat and nerve transmission. Zinc is needed for proper formation of RNA and DNA, and also is necessary for growth and sexual development, especially in women. Administration of moderate amounts of zinc in persons over seventy years of age has been associated with improved delayed hypersensitivity and an increase in the number of circulating T cells. Copper is necessary for collagen synthesis, and for the maintenance of collagen structures. Copper is also essential for proper functioning of Vitamin C.

In addition to the foregoing, other edible substances, including other edible plant extracts, have been shown to exhibit beneficial physiological effects. Bioflavonoids reduce capillary fragility and protect biologically-important compounds through antioxidant activity. Bioflavonoids also exhibit anti-allergy properties. The bioflavonoid hesperidin is known to improve capillary permeability, and has been used in the treatment of neuropathies; while the bioflavonoid rutin is linked to strengthening of the capillaries and anti-inflammatory effects.

The carotenoid lycopene may reduce the risk of prostate and breast cancer. It has been inversely associated with the risk of cervical cancer in women. Also, the carotenoid lutein has been linked to a decrease in the risk of macular degeneration. Isoflavones are known to have estrogenic effects in women. Soy isoflavones, in particular, are said to prevent cancer, reduce cholesterol, reverse osteoporosis, and eliminate menopausal symptoms. Soy isoflavones also have been shown to be protective against heart disease. The catechins in green tea may prevent the cell damage that causes cancer. Catechins also have been found effective in the treatment of atopic dermatitis. Catechins may also reduce the risk of heart disease and stroke.

Other substances also provide nutritional benefits. Creatine is linked to an increase in athletic performance, and may assist in gaining muscle mass. Creatine monohydrate studies show that it boosts size and muscle strength, and increases lean body mass. Phosphate salts are linked to increased energy production and aerobic metabolism. They may also increase the ability of the blood to move oxygen to working muscles and neutralize the production of lactic acid. Dehydroepiandrosterone (DHEA) assists with adrenal deficiency, diabetes and depression, and also is shown to increase energy, improve sleep, and retard signs of aging. It also has been shown to assist in recovery time and fat loss. Coenzyme $Q_{10}$ ($CoQ_{10}$) exhibits antioxidant properties, and has been shown to affect the immune system, and is considered as an adjuvant therapy for cancer. Chondroitin sulfate may slow cartilage breakdown and even spur cartilage growth. Dimethylaminoethyl (DMAE) accelerates the production of acetylcholine, necessary for proper brain functioning. Inositol hexaphosphate (IP6) aids in hair growth, as well as production of bone marrow cells. It also assists the liver in fat transfer. Pyruvate, especially from calcium, has been linked with increased exercise performance and enhanced fat loss. Methylsulfonylmethyl (MSM), is a naturally occurring organic sulfur, which (sulfur) is necessary for the creation and regeneration of tissues, as well as collagen synthesis. Sulfur also is a major component in the formation of cartilage and connective tissues While nutritional supplements are known containing many of the foregoing components, in varying combinations for varying target audiences (i.e., women, athletes, the elderly), presently available nutritional supplements suffer from two deficiencies. First, most nutritional supplements lack a pleasant flavor, so that their daily use (as required for maximum benefit) is compromised by unappealing taste. Second, presently available nutritional supplements generally appear in pill, tablet or capsule form. As such, they must be ingested, and dissolved in the stomach prior to absorption into the bloodstream. This delay between ingestion of the supplement and its absorption into the bloodstream (and the concomitant realization of the beneficial physiologic effect) can be significant, particularly where a supplement is ingested immediately prior to, during, or immediately after exercise. In such a circumstance, the individual requires as immediate an effect as can be realized. Any delay caused by the need to first dissolve the supplement and then transport it into the bloodstream, can prove harmful, or at least can lessen the benefit to be obtained from the supplement.

What is needed is a protein-rich nutritional supplement that includes vitamins, minerals, amino acids or their derivatives and/or analogs, and/or other physiologically beneficial substances, that presents a pleasant taste (improved palatability), and that is in an oral unit dosage form such that the nutritive and dietary benefits of the supplement are able to be quickly absorbed into the bloodstream for maximum effect.

Accordingly, the present invention provides a protein-rich nutritional supplement that includes vitamins, minerals, amino acids or their derivatives and/or analogs, and/or other physiologically beneficial substances, that presents a pleasant taste (improved palatability), and that is in an oral unit dosage form such that the nutritive and dietary benefits of the supplement are able to be quickly absorbed into the bloodstream for maximum effect.

SUMMARY OF THE INVENTION

The agglomerated granular protein-rich nutritional supplement comprising a mixture of: approximately 13 to 100 percent by weight edible nutritional food proteins; up to 57 percent by weight edible carbohydrates; up to 10 percent by weight edible fats; up to 15 percent by weight edible dietary vitamins and minerals; up to 78 percent by weight edible amino acids; up to 10 percent by weight edible plant extracts; and up to 4 percent by weight chondroitin sulfate, the nutritional supplement being agglomerated and granular in an oral unit dosage form such that it is directly absorbable onto the tongue or rapidly dissolvable in an aqueous liquid.

The edible nutritional food proteins may be one or more of whey proteins, milk proteins, their isolates, concentrates and hydrosylates, whey growth factor extract, glutamine peptide, egg albumen, Dutch process chocolate, soy proteins, and caseinates. The edible carbohydrates may be one or more of ribose, dextrose, dietary fiber, maltodextrin, fructose, pyruvates, and glucosamine. The edible fats may be one or more of flaxseed oil, phosphatidylserine, phosphatidylcholine, docosahexaenoic acid (DHA), and eicosapentaenoic acid (EPA). The edible dietary vitamins may be one or more of fat soluble vitamins, B vitamins, B-complex vitamins and analogs thereof, vitamin C, and folic acid. The edible dietary minerals may be one or more of calcium, iron, magnesium, phosphorus, potassium, zinc, manganese, sodium, copper, iodine, molybdenum, selenium, chlorides, phosphate salts and chromium. The edible amino acids may be one or more of essential amino acids, non-essential amino acids, creatine, HMB, AKIC, OKG, pyroglutamic acid, 4-hydroxyisoleucine, and DMAE. The edible plant extracts may be one or more of dong quai, cranberry, *Mucuna pruriens*, yohimbine, colosolic acid, beta-carotene, caffeine and evening primrose oil.

In a first preferred embodiment, the protein-rich nutritional supplement comprises a mixture of: approximately 56 to 78 percent by weight edible nutritional food proteins; approximately 13 to 20 percent by weight edible carbohydrates; less than 3 percent by weight edible fats; up to 2 percent by weight edible dietary vitamins and minerals; up to 27 percent by weight edible amino acids; and up to 1 percent by weight edible plant extracts, with the edible nutritional food proteins being selected from among whey proteins, milk proteins, egg albumen and glutamine peptide; the edible dietary vitamins being selected from among vitamin C, vitamin E and folic acid; the edible amino acids being selected from among alanine, AKIC, asparagine, OKG, leucine, isoleucine, and valine; and the edible plant extracts being selected from among caffeine and beta-carotene.

In a second preferred embodiment, the protein-rich nutritional supplement comprises a mixture of: approximately 44 to 70 percent by weight edible nutritional food proteins; approximately 21 to 44 percent by weight edible carbohydrates; approximately 3 to 7 percent by weight edible fats; up to 6 percent by weight edible dietary vitamins and minerals; up to 5 percent by weight edible amino acids; and up to 1 percent by weight edible plant extracts, with the edible natural food proteins being selected from among whey proteins, milk proteins, and egg albumen; the edible dietary vitamins being selected from among a multivitamin and mineral premixture and folic acid; the edible amino acids being selected from among of AKIC and taurine; and the edible plant extracts being beta-carotene.

In a third preferred embodiment, the protein-rich nutritional supplement comprises a mixture of: approximately 53 to 70 percent by weight edible nutritional food proteins; approximately 26 to 28 percent by weight edible carbohydrates; up to 4 percent by weight edible fats; up to 0.3 percent by weight edible dietary vitamins and minerals; up to 16 percent by weight edible amino acids; and approximately 0.5 to 1.5 percent by weight edible plant extracts, with the edible nutritional food proteins being whey protein isolate; the edible dietary vitamins being niacin; the edible amino acids being selected from among tyrosine, DMAE, phenylalanine, and pyroglutamic acid; and the edible plant extracts being selected from among caffeine and yohimbine.

In a fourth preferred embodiment, the protein-rich nutritional supplement comprises a mixture of: approximately 75 to 78 percent by weight edible nutritional food proteins; less than 4 to 6 percent by weight edible carbohydrates; approximately 6 to 8 percent by weight edible fats; approximately 5 to 7 percent by weight edible dietary vitamins and minerals; up to 5 percent by weight edible amino acids; and approximately 0.2 to 9 percent by weight edible plant extracts, with the edible nutritional food proteins being selected from among whey protein isolate, milk protein isolate, egg albumen, and soy proteins; the edible dietary vitamins being folic acid; the edible dietary minerals being selected from among calcium, iron, phosphate salts, and chromium; the edible amino acids being selected from among taurine and 4-hydroxyisoleucine; and the edible plant extracts being selected from among cranberry extract, dong quai, evening primrose, beta-carotene and colosolic acid.

In a fifth preferred embodiment, the protein-rich nutritional supplement contains a mixture of: approximately 13 to 100 percent by weight edible nutritional food proteins; up to 57 percent by weight edible carbohydrates; less than 2 percent by weight edible fats; less than 3 percent by weight edible dietary vitamins and minerals; and up to 78 percent by weight edible amino acids; with the edible nutritional food proteins being selected from among whey proteins, whey growth factor extract, glutamine peptide and Dutch process cocoa; the edible carbohydrates including dietary fiber and/or ribose; the edible dietary vitamins being selected from among niacin and Inzitol®; and the edible amino acids being selected from among creatine monohydrate, arginine, glutamine, lysine and taurine.

In a sixth preferred embodiment, the protein-rich nutritional supplement comprises a mixture of: approximately 25 percent by weight edible nutritional food proteins; approximately 50 percent by weight edible carbohydrates; approximately 10 percent by weight edible fats; and approximately 15 percent by weight edible dietary vitamins and minerals, with the edible nutritional food proteins being selected from among whey protein concentrate, milk protein isolate, egg albumen, and caseinates; the edible fats being selected from among DHA and EPA, and also including edible dietary vitamins and minerals as an amount of a multivitamin and mineral pre-mixture sufficient to provide 50 percent of the recommended daily allowance (RDA) of the included vitamins and minerals.

In a seventh preferred embodiment, the protein-rich nutritional supplement comprises a mixture of: approximately 56 percent by weight edible nutritional food proteins; approximately 7 percent by weight edible carbohydrates; approximately 36 percent by weight edible amino acids; and approximately 0.15 percent by weight edible plant extracts, with the edible nutritional food proteins being whey protein isolate, the edible amino acids being selected from among creatine, HMB, alanine, taurine, glutamine and 4-hydroxyisoleucine; and the edible plant extracts being colosolic acid.

In a eighth preferred embodiment, the protein-rich nutritional supplement comprises a mixture of: approximately 28 percent by weight edible nutritional food proteins; approximately 56 percent by weight edible carbohydrates; approximately 5 percent by weight edible fats; approximately 7 percent by weight edible amino acids; approximately 0.3 percent by weight edible plant extracts; and approximately 3.3 percent by weight edible dietary vitamins and minerals, with the edible nutritional food proteins being one or more of whey protein isolate, milk protein isolate, glutamine peptide and egg albumen; the edible carbohydrates being one or more of dextrose, maltodextrin and fructose; the edible fats being one or more of DHA, EPA and flaxseed oil; the edible amino acids being one or more of creatine and alanine; the edible plant extracts being *Mucuna pruriens*, and the edible dietary vitamins and minerals being an amount of a multivitamin and mineral pre-mixture sufficient to provide 100 percent of the RDA of the included vitamins and minerals.

In a ninth preferred embodiment, the protein-rich nutritional supplement comprises a mixture of: approximately 49 percent by weight edible nutritional food proteins; less than 7 percent by weight edible carbohydrates; approximately 6 percent by weight edible fats; approximately 7 percent by weight edible dietary vitamins and minerals; approximately 27 percent by weight edible amino acids; and approximately 4 percent by weight chondroitin sulfate. The edible nutritional proteins are one or more of milk protein isolate and egg albumen. The edible fat is flaxseed oil. The edible dietary vitamins are one or more of vitamin C and vitamin E. The edible dietary mineral is calcium. The edible amino acids are one or more of glutamine and creatine.

The present invention also is directed to a method of supplementing the nutritional intake of individuals engaged in bodybuilding and protein supplementation, bodybuilding and meal replacement, bodybuilding and exercise recovery, and bodybuilding and mass gaining; augmenting the mental acuity and energy of humans; supplementing the nutritional intake of women; supplementing the nutritional intake of male bodybuilders; supplementing the nutritional intake of children and adolescents; and supplementing the nutritional intake of older adults, by orally administering an appropriate formulation of the protein-rich nutritional supplement. The nutritional supplement is in the form of agglomerated granules or a rapidly dissolvable wafer and includes a flavoring compound and an effervescing compound.

DETAILED DESCRIPTION OF THE INVENTION

The agglomerated granular protein-rich nutritional supplement of the present invention comprises a mixture of edible nutritional food proteins; edible carbohydrates; edible fats; edible dietary vitamins and minerals; edible amino acids; and edible plant extracts. The supplement is agglomerated in a granular fashion in an oral unit dosage form such that it is directly absorbable onto the tongue or rapidly dissolvable in an aqueous liquid. The supplement is formulated to enhance the nutritional intake of various types of persons of disparate ages, genders, and levels of physical activity. The supplement is prepared in an oral unit dosage form, and includes an effervescing compound, such that the supplement may be absorbed directly on the tongue or rapidly dissolved in an aqueous liquid, such as water. Thus, the full nutritional potential of the supplement may be realized by the user.

Edible nutritional food proteins included in the nutritional supplement may be selected from among whey proteins, milk proteins, glutamine peptide, soy proteins, as well as isolates, concentrates and hydrosylates thereof, whey growth factor extract, Dutch Process cocoa, egg albumen, lactoferrin, methoxyisoflavone and caseinates, as well as any analog or derivative thereof, individually or in any combination. Edible carbohydrates may be selected from among ribose, fructose, fructooligosaccharides, dietary fiber, fractionated rice oligodextrins, dietary glycerol and/or glycerine, glucommanan, Fibersol® 2, dextrose, maltodextrin, fructose, pyruvates, and glucosamine, as well as any analog or derivative thereof, individually or in any combination.

Suitable edible fats include flaxseed oil, hemp oil, conjugated linoleic acid (CLA), medium chain triglycerides (MCTs), phosphatidylserine, phosphatidylcholine, docosahexaenoic acid (DHA), and eicosapentaenoic acid (EPA), as well as any analog or derivative thereof, individually or in any combination. Suitable edible dietary vitamins include fat soluble vitamins, B and B-complex vitamins (including biotin), vitamin C, and folic acid., as well as any analog or derivative thereof, individually or in any combination Suitable edible dietary minerals include calcium, iron, magnesium, phosphorus, potassium, zinc, manganese, sodium, copper, iodine, molybdenum, selenium, chlorides, phosphate salts and chromium, as well as any analog or derivative thereof, individually or in any combination. Preferably all vitamins and minerals are first combined in a multivitamin/mineral pre-mix, before inclusion in a particular formulation. Such pre-mix, when incorporated into one or more of the formulations of the protein-rich nutritional supplement of the present invention, provides 20 to 300 percent of the recommended daily allowance (RDA) of the vitamins and minerals mixed therein, and preferably provides 50 to 100 percent of the RDA. Preparation of the pre-mix is by conventional methods known in the vitamin and nutritional supplement industry, and uses conventional pharmaceutically suitable forms of the included edible dietary vitamins and minerals.

Edible amino acids for inclusion in the nutritional supplement of the present invention include essential amino acids, viz., methionine, phenylalanine, threonine, tryptophan, valine, isoleucine, leucine and lysine; non-essential amino acids, glutamine, pyroglutamic acid, taurine, arginine, ornithine, histidine, proline, carnitine, tyrosine, cysteine, cystine, glycine, asparagine, aspartic acid, citrulline and glutathione; creatine; HMB; AKIC; ketoisocaproate (KIC); OKG; N-acetyl cysteine (NAC); alpha-ketoglutarate (AKG); glycocyamine; NADH; acetyl-L-carnitine; pyroglutamic acid; 4-hydroxyisoleucine; aminolevulinic acid (ALA); melatonin; L-Dopa; theanine; 5-hydroxytryptophan (5-HTP); SAM-e; and DMAE, as well as any analog or derivative thereof, individually or in any combination.

Edible plant extracts for use in the nutritional supplement of the present invention may be selected from among guarana, kola nut, ginseng, kava kava, Ephedra™, ephedrine, synephrine, zhi shi, naringin, dong quai, chasteberry, black cohosh, cranberry, valerian, St. John's wort, ginko biloba, *Mucuna pruriens*, white willow, white kidney bean, red kidney bean, maca, goat weed, yohimbine, *Coleus forskohii*, Ma huang, *Citrus aurantium*, green tea, caffeine, beta-carotene, methoxyisoflavone, chrysin, *Tribulus terrestris*, ipriflavone, beta-ecdysterone, Echinacea, saw palmetto, olive leaf, colosolic acid, lutein, lycopene, Shitake mushroom, evening primrose oil (GLA), hemp oil, flaxseed oil, Rhodiola, and bitter orange, as well as any analog or derivative thereof, individually or in any combination.

Pro-hormones and pro-steroids preferably to be included in one or more of the preferred formulations include andro, androstenedione, DHEA, 1-TEST, 1-androstenediol, 19-norandrostenediol, and 7-keto-DHEA, as well as any analog or derivative thereof, individually or in any combination. Other dietary and nutritional compounds that may be incorporated include ZMA, choline, HCA, D-pinitol, biopein, biopterin, octopamine, $CoQ_{10}$, chondroitin sulfate, MSM, cetyl myristoleate, IP6, quercitin, and zeaxanthin, as well as any analog or derivative thereof, individually or in any combination.

The preferred of each of the foregoing components of the nutritional supplement of the present invention will be apparent from the following examples.

The present invention provides a method of supplementing the nutritional intake of individuals engaged in bodybuilding and protein supplementation by administering an oral unit dosage form of the following formulation of the nutritional supplement:
- approximately 56 to 78 percent by weight edible nutritional food proteins;
- approximately 13 to 20 percent by weight edible carbohydrates;
- less than 3 percent by weight edible fats;
- approximately 0 to 2 percent by weight edible dietary vitamins and minerals;
- approximately 0 to 27 percent by weight edible amino acids; and
- approximately 0 to 1 percent by weight edible plant extracts.

In this formulation, preferred edible food proteins may be selected from among whey proteins, milk proteins, their isolates, concentrates and hydrosylates, egg albumen and glutamine peptide. Preferred edible dietary vitamins may be vitamin C, vitamin E and/or folic acid; preferred edible amino acids may be one or more of alanine, AKIC, asparagine, OKG, leucine, isoleucine, and valine; and the preferred edible plant extracts may be caffeine and/or beta-carotene. The following specific examples of supplements under this formulation are included (each example represents a single oral unit dosage form). Stated mass and IU amounts represent the best mode for the particular example. Such amounts may be varied by up to 10% in either direction without adversely affecting the nutritional benefit of the particular supplement:

| Example 1: 30.1 g of supplement | | |
|---|---|---|
| Component | Wt | % by wt |
| Protein | 20 g | 66.45 |
| Carbohydrate | <6 g | 19.93 |
| Fat | <1 g | 3.32 |
| Edible amino acids | 2.5 g | 8.31 |
| Edible dietary vitamins/minerals | 500 mg* | 1.66 |
| Edible plant extracts | 100 mg | 0.33 |

The edible amino acid is beta-alanine. Edible vitamins include 500 mg vitamin C, and 200 IU of vitamin E. The plant extract is caffeine. Caffeine in this example (as in all examples incorporating caffeine) is from anhydrous caffeine.

| Example 2: 44.40 g of supplement | | |
|---|---|---|
| Component | Wt | % by wt |
| Protein | 25 g | 56.31 |
| Carbohydrate | <6 g | 13.51 |
| Fat | <1 g | 3.15 |
| Edible amino acids | 12 g | 27.03 |
| Edible dietary vitamins/minerals | <1 g | .0002 |
| Edible plant extracts | —* | — |

Edible fats include 400 mg phosphatidylcholine. Edible amino acids include 2.5 g AKIC, 2.5 g asparagine, 3 g OKG, 1600 mg leucine, 1200 mg isoleucine, and 1200 mg valine, Edible vitamins are represented by 1000 μg of folic acid. Edible plant extracts are represented by 20000 IU beta-carotene.

| Example 3: 32 g of supplement | | |
|---|---|---|
| Component | Wt | % by wt |
| Protein | 25 g | 78.13 |
| Carbohydrate | <6 g | 18.75 |
| Fat | <1 g | 3.13 |

The present invention also provides a method of supplementing the nutritional intake of individuals engaged in body-building and meal replacement by administering an oral unit dosage form of the following formulation of the nutritional supplement:

approximately 44 to 70 percent by weight edible nutritional food proteins;

approximately 21 to 44 percent by weight edible carbohydrates;

approximately 3 to 7 percent by weight edible fats;

approximately 0 to 6 percent by weight edible dietary vitamins and minerals;

approximately 0 to 5 percent by weight edible amino acids; and approximately 0 to 1 percent by weight edible plant extracts.

In this formulation, the preferred edible natural food proteins are one or more of whey proteins, milk proteins, their isolates, concentrates, and hydrosylates, and egg albumen. The preferred edible dietary vitamins consist of a multivitamin and mineral pre-mixture and/or folic acid. The preferred edible amino acids are AKIC and/or taurine. The preferred edible plant extract is beta-carotene. The following specific examples of supplements under this formulation are included (each example represents a single oral unit dosage form). Stated mass and IU amounts represent the best mode for the particular example. Such amounts may be varied by up to 10% in either direction without adversely affecting the nutritional benefit of the particular supplement:

| Example 4: 45.967 g of the supplement | | |
|---|---|---|
| Component | Wt | % by wt |
| Protein | 20 g | 43.99 |
| Carbohydrate | 20 g | 43.99 |
| Fat | 3 g | 6.60 |
| Edible dietary vitamins and minerals | 2.967 g* | 5.42 |

Edible carbohydrates preferably are maltodextrin and/or dextrose. Edible fat preferably is flaxseed oil. Edible dietary vitamins and minerals are from a multivitamin and mineral pre-mix, in an amount sufficient to provide 50% of the recommended daily allowance (RDA) of the included vitamins and minerals. Specifically, the pre-mix comprises the following (amounts variable in either direction by up to 10%):

| Component | Wt | Component | Wt | Component | Wt |
|---|---|---|---|---|---|
| Vit A | 2500 IU | Vit $B_6$ | 1 mg | Cl$^-$ | 1700 mg |
| Vit D | 200 IU | Vit $B_{12}$ | 3 μg | Fe | 9 mg |
| Vit E | 15 IU | Biotin | 150 μg | P | 500 mg |
| Vit K | 40 μg | Folate | 200 μg | Mg | 200 mg |
| Vit C | 30 mg | Ca | 500 mg | Se | 35 μg |
| Thiamin | 0.75 mg | I | 75 μg | Mn | 1 mg |
| Riboflavin | 0.85 mg | Zn | 7.5 mg | Mb | 37.5 μg |
| Niacin | 10 mg | Cu | 1 mg | | |
| Pantothenic a. | 5 mg | Cr | 60 μg | | |

| Example 5: 71.00 g of the supplement | | |
|---|---|---|
| Component | Wt | % by wt |
| Protein | 50 g | 70.42 |
| Carbohydrate | 15 g | 21.13 |
| Fat | 2.4 g | 3.38 |
| Edible amino acids | 3.5 g | 4.93 |
| Edible dietary vitamins/minerals | 1000 μg | .001 |
| Edible plant extracts | —* | — |

Edible fat is preferably DHA, EPA and/or flaxseed oil, and includes 400 mg phosphatidylserine. Edible amino acids include AKIC and taurine/ Edible vitamins are represented by folic acid. The edible plant extract is 20000 IU beta-carotene. The carbohydrate of in this formulation is dextrose and/or maltodextrin.

The present invention also provides a method of augmenting mental acuity and energy by administering an oral unit dosage form of the following formulation of the nutritional supplement:

approximately 53 to 70 percent by weight edible nutritional food proteins;

approximately 26 to 28 percent by weight edible carbohydrates;

approximately 0 to 4 percent by weight edible fats;

approximately 0 to 0.3 percent by weight edible dietary vitamins and minerals;

approximately 0 to 16 percent by weight edible amino acids; and approximately 0.5 to 1.5 percent by weight edible plant extracts.

In this formulation, the edible nutritional food protein preferably is whey protein isolate; the edible dietary vitamin preferably is niacin; the edible amino acids preferably are one or more of tyrosine, DMAE, phenylalanine, and pyroglutamic acid; and the edible plant extracts preferably are caffeine and/or yohimbine. The following specific examples of supplements under this formulation are included (each example represents a single oral unit dosage form). Stated mass and IU amounts represent the best mode for the particular example. Such amounts may be varied by up to 10% in either direction without adversely affecting the nutritional benefit of the particular supplement:

Example 6: 18.85 g of formulation

| Component | Wt | % by wt |
|---|---|---|
| Protein | 10 g | 53.05 |
| Carbohydrate | 5 g | 26.53 |
| Fat | 700 mg | 3.71 |
| Edible amino acids | 3 g | 15.92 |
| Edible dietary vitamins/minerals | 50 mg | 0.27 |
| Edible plant extracts | 100 mg | 0.53 |

Edible carbohydrates include 1 g pyruvates and 1 g D-ribose. Pyruvate preferably is in the form of calcium pyruvate or potassium pyruvate. Fat is from phosphatidylserine (200 mg) and phosphatidylcholine (500 mg). Edible amino acids include 2 g tyrosine, 250 mg DMAE, 250 mg phenylalanine, and 500 mg pyroglutamic acid. Edible vitamins are represented by niacin, preferably as nicotinic acid. The edible plant extract is caffeine.

Example 7: 14.20 g of formulation

| Component | Wt | % by wt |
|---|---|---|
| Protein | 10 g | 70.41 |
| Carbohydrate | 4 g | 28.16 |
| Edible plant extracts | 202 mg | 1.43 |

Edible carbohydrate includes 3 g dextrose and 1 g pyruvate, preferably in the form of calcium pyruvate and/or potassium pyruvate. Edible plant extracts include 200 mg caffeine and 2 mg yohimbine, preferably from the Yohimbe tree.

The present invention also provides a method of supplementing the nutritional intake of women by administering an oral unit dosage form of the following formulation of the nutritional supplement:

approximately 75 to 78 percent by weight edible nutritional food proteins;

less than 4 to 6 percent by weight edible carbohydrates;

approximately 6 to 8 percent by weight edible fats;

approximately 5 to 7 percent by weight edible dietary vitamins and minerals;

approximately 0 to 5 percent by weight edible amino acids; and approximately 0.2 to 9 percent by weight edible plant extracts.

In this formulation, the edible nutritional food proteins preferably are one or more of whey protein isolate, milk protein isolate, egg albumen, and soy proteins. The edible dietary vitamin preferably is folic acid. The edible amino acids preferably are taurine and/or 4-hydroxyisoleucine. The edible plant extracts preferably are cranberry extract, dong quai, evening primrose oil (GLA), beta-carotene and/or colosolic acid; and the edible minerals preferably are calcium, iron, phosphate salts, and/or chromium. The following specific examples of supplements under this formulation are included (each example represents a single oral unit dosage form). Stated mass and IU amounts represent the best mode for the particular example. Such amounts may be varied by up to 10% in either direction without adversely affecting the nutritional benefit of the particular supplement:

Example 8: 15.86 g of supplement

| Component | Wt | % by wt |
|---|---|---|
| Protein | 12 g | 75.66 |
| Carbohydrate | <1 g | 6.31 |
| Fat | <1 g | 6.31 |
| Edible dietary vitamins/minerals | 611 mg | 3.86 |
| Edible plant extracts | 1.25 g | 9.14 |

Edible dietary vitamins are represented by 1000 μg folic acid. The edible dietary minerals are calcium (600 mg) and iron (10 mg). Edible plant extracts are cranberry extract (400 mg), dong quai (600 mg), and GLA from Evening Primrose (250 mg).

Example 9: 25.81 g of supplement

| Component | Wt | % by wt |
|---|---|---|
| Protein | 20 g | 77.49 |
| Carbohydrate | 1 g | 3.87 |
| Fat | 2 g | 7.75 |
| Edible amino acids | 1.25 g | 4.84 |
| Edible dietary vitamins/minerals | 1.511 g | 5.85 |
| Edible plant extracts | 50 mg* | 0.19 |

Edible fat is derived from DHA and/or EPA. Edible amino acids include 1 g taurine, and 250 mg 4-hydroxyisoleucine. Edible dietary vitamins are 1000 μg folic acid. Edible dietary minerals are 0.2 mg chromium, 500 mg calcium, 10 mg iron and 1 g phosphate salts. Edible plant extracts include colosolic acid and 10,000 IU beta-carotene.

The present invention also provides a method of supplementing the nutritional intake of male bodybuilders by administering an oral unit dosage form of the following formulation of the nutritional supplement:

approximately 13 to 100 percent by weight edible nutritional food proteins;

approximately 0 to 57 percent by weight edible carbohydrates;

less than 2 percent by weight edible fats;

less than 3 percent by weight edible dietary vitamins and minerals; and approximately 0 to 78 percent by weight edible amino acids.

In this formulation, the edible nutritional food proteins preferably are one or more of whey proteins, their isolates and hydrosylates, whey growth factor extract, glutamine peptide and Dutch process cocoa. Edible carbohydrates preferably include dietary fiber and/or ribose. Edible dietary vitamins preferably are one or more of niacin and Inzitol®. Edible amino acids preferably include creatine monohydrate, arginine, glutamine, lysine and taurine. The following specific examples of supplements under this formulation are included (each example represents a single oral unit dosage form). Stated mass and IU amounts represent the best mode for the particular example. Such amounts may be varied by up to 10% in either direction without adversely affecting the nutritional benefit of the particular supplement:

Example 10: 17.01-36.05 g of supplement

| Component | Wt | % by wt |
|---|---|---|
| Protein | 17-30 g | 73.75-99.97 |
| Carbohydrate | <6 g | 35.27 |
| Edible dietary vitamins/minerals | 10-50 mg | 0.3 |

Edible nutritional proteins are one or more of whey protein isolate, whey protein hydrosylate, whey growth factor extract, glutamine peptide, and Dutch process cocoa. Edible carbohydrates can include up to 3 g dietary fiber. Edible dietary vitamins are represented by niacin.

Example 11: 14.49-56.30 g of supplement

| Component | Wt | % by wt |
|---|---|---|
| Protein | 5-20 g | 13.40-72.77 |
| Carbohydrate | 1-10 g | 2.31-57.19 |
| Fat | 0-1 g | 1.95 |
| Edible amino acids | 7.45-21 g | 19.22-77.68 |
| Edible dietary vitamins/minerals | 35-300 mg | 2.18 |

Edible nutritional protein is whey protein isolate. Edible carbohydrates include 1-4 g ribose. Edible amino acids include 3-7 g creatine monohydrate, 2-5 g L-arginine, 2-5 g L-glutamine, 0.2-2 g L-lysine, and 0.25-2 g taurine. Edible dietary vitamins and minerals include 10-50 mg niacin and 25-250 mg Inzitol®.

The present invention also provides a method of supplementing the nutritional intake of children and adolescents by administering an oral unit dosage form of the following formulation of the nutritional supplement:
approximately 25 percent by weight edible nutritional food proteins;
approximately 50 percent by weight edible carbohydrates;
approximately 10 percent by weight edible fats; and
approximately 15 percent by weight edible dietary vitamins and minerals.

In this formulation, the edible nutritional food proteins preferably are one or more of whey protein concentrate, milk protein isolate, egg albumen, and caseinates. The edible fats preferably are DHA and/or EPA, and the edible dietary vitamins and minerals are from the multivitamin and mineral pre-mixture in an amount sufficient to provide 50 percent of the RDA of the included vitamins and minerals. The following specific example of a supplement under this formulation is included (the example represents a single oral unit dosage form). Stated mass and IU amounts represent the best mode for the particular example. Such amounts may be varied by up to 10% in either direction without adversely affecting the nutritional benefit of the supplement:

Example 12: 19.967 g of supplement

| Component | Wt | % by wt |
|---|---|---|
| Protein | 5 g | 25.04 |
| Carbohydrate | 10 g | 50.08 |
| Fat | 2 g | 10.02 |
| Edible dietary vitamins/minerals | 2.967 g* | 14.86 |

The edible fat preferably is from DHA and/or EPA. Edible dietary vitamins are the multivitamin and mineral pre-mix, in an amount sufficient to provide 50% of the RDA. Specifically, the pre-mix comprises the following (amounts variable by up to 10% in either direction):

| Component | Wt | Component | Wt | Component | Wt |
|---|---|---|---|---|---|
| Vit A | 2500 IU | Vit $B_6$ | 1 mg | Cl$^-$ | 1700 mg |
| Vit D | 200 IU | Vit $B_{12}$ | 3 μg | Fe | 9 mg |
| Vit E | 15 IU | Biotin | 150 μg | P | 500 mg |
| Vit K | 40 μg | Folate | 200 μg | Mg | 200 mg |
| Vit C | 30 mg | Ca | 500 mg | Se | 35 μg |
| Thiamin | 0.75 mg | I | 75 μg | Mn | 1 mg |
| Riboflavin | 0.85 mg | Zn | 7.5 mg | Mb | 37.5 μg |
| Niacin | 10 mg | Cu | 1 mg | | |
| Pantothenic a. | 5 mg | Cr | 60 μg | | |

The present invention also provides a method of supplementing the nutritional intake of persons engaged in bodybuilding and exercise recovery by administering an oral unit dosage form of the following formulation of the nutritional supplement:
approximately 56 percent by weight edible nutritional food proteins;
approximately 7 percent by weight edible carbohydrates;
approximately 36 percent by weight edible amino acids; and
approximately 0.15 percent by weight edible plant extracts,.

In this formulation, the edible nutritional food protein preferably is whey protein isolate. The edible amino acids preferably are creatine, HMB, alanine, taurine, glutamine and 4-hydroxyisoleucine; and the edible plant extract is colosolic acid. The following specific example of a supplement under this formulation is included (the example represents a single oral unit dosage form). Stated mass and IU amounts represent the best mode for the particular example. Such amounts may be varied by up to 10% in either direction without adversely affecting the nutritional benefit of the supplement:

Example 13: 35.3 g of supplement

| Component | Wt | % by wt |
|---|---|---|
| Protein | 20 g | 56.66 |
| Carbohydrate | 2.5 g | 7.08 |
| Edible amino acids | 12.75 g | 36.12 |
| Edible plant extracts | 50 mg | 0.14 |

Edible carbohydrates are D-ribose. Edible amino acids are 5 g creatine, 1.5 g HMB, 2.5 g alanine, 1 g taurine, 2.5 g glutamine and 250 mg 4-hydroxyisoleucine. The edible plant extract is colosolic acid.

The present invention also provides a method of supplementing the nutritional intake of persons engaged in body-building and mass gaining by administering an oral unit dosage form of the following formulation of the nutritional supplement:

approximately 28 percent by weight edible nutritional food proteins;
approximately 56 percent by weight edible carbohydrates;
approximately 5 percent by weight edible fats;
approximately 7 percent by weight edible amino acids;
approximately 0.3 percent by weight edible plant extracts; and
approximately 3.3 percent by weight edible dietary vitamins and minerals.

In this formulation, the edible nutritional food proteins preferably are one or more of whey protein isolate, milk protein isolate, glutamine peptide and egg albumen. The edible carbohydrates preferably are one or more of dextrose, maltodextrin and fructose. The edible fats preferably are one or more of DHA, EPA and flaxseed oil. The edible amino acids preferably are creatine and alanine; and the edible plant extract preferably is *Mucuna pruriens*. The formulations also includes edible dietary vitamins and minerals preferably as an amount of the multivitamin and mineral pre-mixture sufficient to provide 100 percent of the RDA of the included vitamins and minerals. The following specific example of a supplement under this formulation is included (the example represents a single oral unit dosage form). Stated mass and IU amounts represent the best mode for the particular example. Such amounts may be varied by up to 10% in either direction without adversely affecting the nutritional benefit of the supplement:

Example 14: 177.433 g of supplement

| Component | Wt | % by wt |
|---|---|---|
| Protein | 50 g | 28.18 |
| Carbohydrate | 100 g | 56.36 |
| Fat | 9 g | 5.07 |
| Edible amino acids | 12 g | 6.76 |
| Edible plant extracts | 500 mg | 0.28 |
| Edible dietary vitamins and mineral | 5.933 g* | 3.34 |

Edible proteins include 15 g glutamine peptide. The carbohydrate is from dextrose, maltodextrin and/or fructose. Fat is preferably from DHA, EPA and/or flaxseed oil. Edible amino acids include 7 g creatine, and 5 g alanine. The edible plant extract is *Mucuna pruriens*. The edible dietary vitamins and minerals are an amount of the multivitamin and mineral premix sufficient to provide 100% of the RDA. Specifically, the pre-mix comprises the following:

| Component | Wt | Component | Wt | Component | Wt |
|---|---|---|---|---|---|
| Vit A | 5000 IU | Vit $B_6$ | 2 mg | Cl⁻ | 3400 mg |
| Vit D | 400 IU | Vit $B_{12}$ | 6 μg | Fe | 18 mg |
| Vit E | 30 IU | Biotin | 300 μg | P | 1000 mg |
| Vit K | 80 μg | Folate | 400 μg | Mg | 400 mg |
| Vit C | 60 mg | Ca | 1000 mg | Se | 70 μg |
| Thiamin | 1.5 mg | I | 150 μg | Mn | 2 mg |
| Riboflavin | 1.7 mg | Zn | 15 mg | Mb | 75 μg |
| Niacin | 20 mg | Cu | 2 mg | | |
| Pantothenic a. | 10 mg | Cr | 120 μg | | |

The present invention also provides a method of supplementing the nutritional intake of older adults by administering an oral unit dosage form of the following formulation of the nutritional supplement:

approximately 49 percent by weight edible nutritional food proteins;
less than 7 percent by weight edible carbohydrates;
approximately 6 percent by weight edible fats;
approximately 7 percent by weight edible dietary vitamins and minerals;
approximately 27 percent by weight edible amino acids; and
approximately 4 percent by weight chondroitin sulfate.

In this formulation, the edible nutritional food proteins preferably are one or more of milk protein isolate and egg albumen. The edible fat preferably is flaxseed oil. The edible dietary vitamins preferably consist of vitamins C and E. The edible dietary mineral preferably is calcium. The edible amino acids preferably are glutamine and creatine. The following specific example of a supplement under this formulation is included (the example represents a single oral unit dosage form). Stated mass and IU amounts represent the best mode for the particular example. Such amounts may be varied by up to 10% in either direction without adversely affecting the nutritional benefit of the supplement:

Example 15: 16.45 g of formulation

| Component | Wt | % by wt |
|---|---|---|
| Protein | 8 g | 48.63 |
| Carbohydrate | 1 g | 7.60 |
| Fat (flaxseed oil) | 600 mg | 6.08 |
| Edible amino acids | 4.5 g | 27.36 |
| Edible dietary vitamins/minerals | 1100 mg* | 6.69 |
| Chondroitin sulfate | 600 mg | 3.65 |

Carbohydrates include 250 mg glucosamine. Edible amino acids are 2.5 g glutamine and 2 g creatine. Edible dietary vitamins include 500 mg vitamin C and 200 IU vitamin E. Edible minerals include 600 mg calcium.

In all examples and formulations, the nutritional supplement is in an oral unit dosage form of either agglomerated granules or a rapidly dissolvable wafer. In either oral unit dosage The nutritional supplements may also include excipients, including a combination of carbohydrate and non-caloric sugar substitute. The carbohydrate preferably is dextrose or maltodextrin. The non-caloric sugar substitute preferably is Splenda® or sucralose. The flavoring compound can be any commercially available flavoring compound used to render dietary and nutritional supplements more palatable, and preferably is a combination of polyoses and/or artificial sweeteners, including, without limitation, sucralose and/or ace-K. The effervescing compound may be any pharmaceutically acceptable compound known to provide effervescence and preferably is a pharmaceutically suitable form of citric acid, sodium bicarbonate or calcium bicarbonate, with the most preferable being a combination of citric acid and sodium bicarbonate.

The excipients are added to each of the above formulations in an amount sufficient to give rise to a flavored, effervescing, agglomerated granular protein-rich nutritional supplement. With respect to the effervescing compound, an amount is added sufficient to give rise to a gentle effervescence of the supplement on the tongue or in aqueous solution. The supplement thus displays an improved palatability over presently existing orally dosed nutritional supplements, with the resulting benefit that the supplement of the present invention is more likely to be used on a regular and prolonged basis, and also is more likely to appeal to persons, i.e., children and adolescents, more likely to find the taste of presently available supplements objectionable. Accordingly, the full nutritional/ physiologic benefits of the nutritional supplements of the present invention are more likely to be realized.

The preferred oral unit dosage forms of the agglomerated granular protein-rich nutritional supplement in accordance with the present invention include agglomerated granules, and rapidly dissolvable wafers. Both oral unit dosage forms are able to be directly absorbed onto the tongue, and also be rapidly dissolved in an aqueous liquid, such as water, for rapid absorption into the bloodstream following ingestion. This is due, in part, to the molecular structure of the agglomerated granule. The agglomerated granule is hyperosmotic to its surrounding; thus, fluids will be secreted by the salivary glands, enter the granule, and dissolve it. Also, the reaction of the effervescing compound with the saliva creates an increasing flow thereof, which again acts to break down and absorb the nutrients contained within the granules. Each of the preferred formulations set forth in the application constitutes a single oral dosage form amount thereof.

Except where specifically indicated, the protein-rich nutritional supplement of the present invention is made from conventional edible nutritional materials known in the pharmaceutical art, and pharmaceutically acceptable for use in nutritional supplements and food additives. All components of a particular formulation, with the exception of excipients such as flavoring and effervescing compounds, are mixed together prior to granulation. Methods of rendering, for example, vitamin formulations into oral dosage forms are known and discussed in U.S. Pat. Nos. 5,494,678 (Paradissis et al.); 5,556,644 (Chandra); and 5,654,011 (Jackson et al. '011 patent); and are incorporated by reference herein. Specifically, in Paradissis et al., the nutritional components are normally blended with conventional excipients, such as binders; lubricants, such as stearic acid; diluents, such as mannose; disintegrants, such as carboxymethyl cellulose; suspending agents, such as polyvinyl alcohol; absorbents, such as silicon dioxide; preservatives, such as sodium benzoate; surfactants, such as polysorbate 80; and colorants, such as F.D. & C. dyes. (U.S. Pat. No. 5,494,678, Col. 9, 11. 47-59). In Chandra, the pure nutrient substances are dry blended using a powder mill unit until they are mixed to form a resultant multinutrient powder. The blending is effected under conditions yielding a particle size of less than 50 microns. (U.S. Pat. No. 5,556,644, Col. 5, 11. 24-29). The dietary supplements of Jackson et al. may be formulated using any pharmaceutically acceptable form of the vitamins, minerals and other ingredients of the invention, including their salts. They may be formulated into capsules, tablets, powders, gels or liquids. (U.S. Pat. No. 5,654,011, Col. 7, 11. 50-67).

Granulation of the agglomerated granular protein-rich nutritional supplement of the present invention may be accomplished by conventional granulating and coating methods known in the pharmaceutical art, including without limitation agglomeration, in which a mixture of the components in a preferred formulation of the supplement is liquefied, dried into small agglomerated granules, and sprayed with the flavor and effervescing components during drying. In a preferred method, all active ingredients and micronutrients are combined in a blender, and mixed into a powder. The mixture includes some of the flavoring agents, as well as the effervescing agents. The remaining flavoring agents, as well as some of the carbohydrate used, is then mixed and heated into a liquid solution. The mixed powder is placed into an agglomerator apparatus and blown upward, into the air. The liquid solution is placed into a flow coater, which sprays a steady stream of liquid into the agglomerator so that, as the particulates float to the level of the liquid flow, they are coated. The resulting weight of the coated granule renders it too heavy to remain suspended, and it drops to the bottom of the agglomerator. Once no more particles are floating in the air, within the agglomerator, the machine is turned off, and the coated granules that have fallen to the bottom of the agglomerator are removed. These granules constitute the agglomerated granular protein-rich supplement of the present invention.

The granular size of the final product is sufficiently small that, when in the agglomerated granule form, the supplement can be placed on the tongue and directly absorbed thereby or rapidly dissolved in an aqueous liquid, such as water.

Where the unit dosage form is a rapidly dissolving wafer, wafer formation from the agglomerated granules is accomplished by conventional wafering methods known in the pharmaceutical art. For example, a manufacturer may formulate the wafer generally as follows: All ingredients are in dry form, and blending takes place in a V-Mixer. Proper distribution of the ingredients is assured by use of conventional trituration. Stearic acid and magnesium stearate are added to the mixture as binding agents. The mixed ingredients are measured, agglomerated, granulated and weighed, using a conventional wafer press and incorporating a volumetric process. Wafers are periodically weighed throughout the process to assure proper mass and size. Finished wafers are sprayed with a water solution of flavoring compound and effervescing compound as a coating. The wafers are then dried under heat. From these references and examples, various preparation processes should be apparent to one of ordinary skill in the art.

While the invention has been described with respect to certain specific embodiments, it will be appreciated that many modifications and changes may be made by those skilled in the art without departing from the invention. It is intended, therefore, by the appended claims to cover all such modifications and changes as may all within the true spirit and scope of the invention.

What is claimed is:

1. An agglomerated granular protein-rich nutritional supplement comprising:
 a plurality of separate hyperosmotic agglomerated granules in an oral unit dosage form of agglomerated granules, each agglomerated granule comprising:
  approximately 13 to 100 percent by weight edible nutritional food proteins;
  edible amino acids, the edible amino acids comprising up to 78 percent by weight of the granule;
  approximately 0.2 percent to about 10 percent by weight edible plant extracts provided as a nutrition source; and
  an effervescing agent;
 the hyperosmotic agglomerated and granulated oral unit dosage form and effervescing agent rendering the composition directly absorbable onto the tongue or rapidly dissolvable in an aqueous liquid environment to facilitate and increase rapid absorption of the nutritional supplement in the bloodstream.

2. The protein-rich nutritional supplement of claim 1, wherein the edible nutritional food proteins are selected from the group consisting of whey proteins and isolates, concentrates and hydrosylates thereof milk proteins and isolates, concentrates and hydrosylates thereof whey growth factor extract; Dutch Process cocoa; glutamine peptide; egg albumen; soy proteins; and caseinates.

3. The protein-rich nutritional supplement of claim 1, further comprising edible carbohydrates selected from the group consisting of ribose, dextrose, dietary fiber, maltodextrin, fructose, pyruvates, and glucosamine.

4. The protein-rich nutritional supplement of claim 1, further comprising edible fats selected from the group consisting of flaxseed oil, phosphatidylserine, phosphatidylcholine, DHA, and EPA.

5. The protein-rich nutritional supplement of claim 1, further comprising edible dietary vitamins and minerals selected from the group consisting of fat soluble vitamins, B vitamins, B-complex vitamins and analogs thereof, vitamin C, folic acid, calcium, iron, magnesium, phosphorus, potassium, zinc, manganese, sodium, copper, iodine, molybdenum, selenium, chlorides, phosphate salts and chromium.

6. The protein-rich nutritional supplement of claim 1, wherein the edible amino acids are selected from the group consisting of essential amino acids, non-essential amino acids, creatine monohydrate, HMB, AKIC, OKG, pyroglutamic acid, 4-hydroxyisoleucine, and DMAE.

7. The protein-rich nutritional supplement of claim 1, wherein the edible plant extracts are selected from the group consisting of dong quai, cranberry, *Mucuna pruriens*, yohimbine, colosolic acid, beta-carotene, caffeine and evening primrose oil.

8. The protein-rich nutritional supplement of claim 1, further comprising a mixture of:
 a. approximately 56 to 78 percent by weight edible nutritional food proteins;
 b. approximately 13 to 20 percent by weight edible carbohydrates;
 c. less than 3 percent by weight edible fats;
 d. approximately 0 to 2 percent by weight edible dietary vitamins and minerals;
 e. approximately 0.10 percent to 27 percent by weight edible amino acids; and
 f. approximately 0.10 percent to 1 percent by weight edible plant extracts,
 wherein the edible nutritional food proteins are selected from the group consisting of whey proteins, milk proteins, egg albumen and glutamine peptide; the edible dietary vitamins and minerals are selected from the group consisting of vitamin C, vitamin E and folic acid; the edible amino acids are selected from the group consisting of alanine, AKIC, asparagine, OKG, leucine, isoleucine, and valine; and the edible plant extracts are selected from the group consisting of caffeine and beta-carotene.

9. The protein-rich nutritional supplement of claim 1, further comprising a mixture of:
 a. approximately 44 to 70 percent by weight edible nutritional food proteins;
 b. approximately 21 to 44 percent by weight edible carbohydrates;
 c. approximately 3 to 7 percent by weight edible fats;
 d. approximately 0 to 6 percent by weight edible dietary vitamins and minerals;
 e. approximately 0.10 percent to 5 percent by weight edible amino acids; and
 f. approximately 0.10 percent to 1 percent by weight edible plant extracts,
 wherein the edible natural food proteins are selected from the group consisting of whey proteins, milk proteins, and egg albumen; the edible dietary vitamins and minerals are selected from the group consisting of a multivitamin and mineral pre-mixture and folic acid; the edible amino acids are selected from the group consisting of AKIC and taurine; and the edible plant extracts comprise beta-carotene.

10. The protein-rich nutritional supplement of claim 1, further comprising a mixture of:
 a. approximately 53 to 70 percent by weight edible nutritional food proteins;
 b. approximately 26 to 28 percent by weight edible carbohydrates;
 c. approximately 0 to 4 percent by weight edible fats;
 d. approximately 0 to 0.3 percent by weight edible dietary vitamins and minerals;
 e. approximately 0.10 percent to 16 percent by weight edible amino acids; and
 f. approximately 0.5 to 1.5 percent by weight edible plant extracts,
 wherein the edible nutritional food proteins comprise whey protein isolate; the edible dietary vitamins and minerals comprise niacin; the edible amino acids are selected from the group consisting of tyrosine, DMAE, phenylalanine, and pyroglutamic acid; and the edible plant extracts are selected from the group consisting of caffeine and yohimbine.

11. The protein-rich nutritional supplement of claim 1, further comprising a mixture of:
   a. approximately 75 to 78 percent by weight edible nutritional food proteins;
   b. less than 4 to 6 percent by weight edible carbohydrates;
   c. approximately 6 to 8 percent by weight edible fats;
   d. approximately 5 to 7 percent by weight edible dietary vitamins and minerals;
   e. approximately 0.10 percent to 5 percent by weight edible amino acids; and
   f. approximately 0.2 to 9 percent by weight edible plant extracts,
   wherein the edible nutritional food proteins are selected from the group consisting of whey protein isolate, milk protein isolate, egg albumen, and soy proteins; the edible dietary vitamins and minerals comprise folic acid; the edible amino acids are selected from the group consisting of taurine and 4-hydroxyisoleucine; the edible plant extracts are selected from the group consisting of cranberry extract, dong quai, evening primrose, beta-carotene and colosolic acid; and the edible minerals are selected from the group consisting of calcium, iron, phosphate salts, and chromium.

12. The protein-rich nutritional supplement of claim 1, further comprising a mixture of:
   a. approximately 13 to 100 percent by weight edible nutritional food proteins;
   b. approximately 0 to 57 percent by weight edible carbohydrates;
   c. less than 2 percent by weight edible fats;
   d. less than 3 percent by weight edible dietary vitamins and minerals; and
   e. approximately 0.10 percent to 78 percent by weight edible amino acids,
   wherein the edible nutritional food proteins are selected from the group consisting of whey proteins, their isolates, hydrosylates and concentrates, whey growth factor extract, glutamine peptide and Dutch process cocoa; the edible carbohydrates comprise dietary fiber and ribose; the edible dietary vitamins and minerals are selected from the group consisting of niacin and Inzitol®; and the edible amino acids are selected from the group consisting of creatine monohydrate, arginine, glutamine, lysine and taurine.

13. The protein-rich nutritional supplement of claim 1, further comprising a mixture of:
   a. approximately 25 percent by weight edible nutritional food proteins;
   b. approximately 50 percent by weight edible carbohydrates;
   c. approximately 10 percent by weight edible fats; and
   d. approximately 15 percent by weight edible dietary vitamins and minerals,
   wherein the edible nutritional food proteins are selected from the group consisting of whey protein concentrate, milk protein isolate, egg albumen, and caseinates; the edible fats are selected from the group consisting of DHA and EPA, and the edible dietary vitamins and minerals are an amount of a multivitamin and mineral pre-mixture sufficient to provide 50 percent of the recommended daily allowance (RDA) of the included vitamins and minerals.

14. The protein-rich nutritional supplement of claim 1, further comprising a mixture of:
   a. approximately 56 percent by weight edible nutritional food proteins;
   b. approximately 7 percent by weight edible carbohydrates;
   c. approximately 36 percent by weight edible amino acids; and
   d. approximately 0.15 percent by weight edible plant extracts,
   wherein the edible nutritional food proteins comprise whey protein isolate, the edible amino acids are selected from the group consisting of creatine monohydrate, HMB, alanine, taurine, glutamine and 4-hydroxyisoleucine; and the edible plant extracts comprise colosolic acid.

15. The protein-rich nutritional supplement of claim 1, further comprising a mixture of:
   a. approximately 28 percent by weight edible nutritional food proteins;
   b. approximately 56 percent by weight edible carbohydrates;
   c. approximately 5 percent by weight edible fats;
   d. approximately 7 percent by weight edible amino acids;
   e. approximately 0.3 percent by weight edible plant extracts; and
   f. approximately 3.3 percent by weight edible dietary vitamins and minerals,
   wherein the edible nutritional food proteins are selected from the group consisting of whey protein isolate, milk protein isolate, glutamine peptide and egg albumen; the edible carbohydrates are selected from the group consisting of dextrose, maltodextrin and fructose; the edible fats are selected from the group consisting of DHA, EPA and flaxseed oil; the edible amino acids are selected from the group consisting of creatine monohydrate and alanine; the edible plant extracts comprise Mucuna pruriens, and the edible dietary vitamins and minerals comprise an amount of a multivitamin and mineral pre-mixture sufficient to provide 100 percent of the RDA of the included vitamins and minerals.

16. The protein-rich nutritional supplement of claim 1, further comprising a mixture of:
   a. approximately 49 percent by weight edible nutritional food proteins;
   b. less than 7 percent by weight edible carbohydrates;
   c. approximately 6 percent by weight edible fats;
   d. approximately 7 percent by weight edible dietary vitamins and minerals;
   e. approximately 27 percent by weight edible amino acids; and
   f. approximately 4 percent by weight chondroitin sulfate,
   wherein the edible nutritional proteins are selected from the group consisting of milk protein isolate and egg albumen, the edible fats comprise flaxseed oil; the edible dietary vitamins and minerals are selected from the group consisting of vitamin C, vitamin E and calcium; and the edible amino acids are selected from the group consisting of glutamine and creatine monohydrate.

17. The protein-rich nutritional supplement of claims 9 or 13, wherein the multivitamin and mineral pre-mixture comprises a mixture of:
   a. approximately 2500 IU vitamin A;
   b. approximately 200 IU vitamin D;
   c. approximately 15 IU vitamin E;
   d. approximately 40 µg vitamin K;
   e. approximately 30 mg vitamin C;
   f approximately 0.75 mg thiamin;

g. approximately 0.85 mg riboflavin;
h. approximately 10 mg niacin;
i. approximately 5 mg pantothenic acid;
j. approximately 1 mg vitamin $B_6$;
k. approximately 3 μg vitamin $B_{12}$;
l. approximately 150 μg biotin;
m. approximately 200 μg folate;
n. approximately 500 mg calcium;
o. approximately 75 μg iodine;
p. approximately 7.5 mg zinc;
q. approximately 1 mg copper;
r. approximately 60 μg chromium;
s. approximately 1700 mg chloride;
t. approximately 9 mg iron;
u. approximately 500 mg phosphorus;
v. approximately 200 mg magnesium;
w. approximately 35 μg selenium;
x. approximately 1 mg manganese; and
y. approximately 37.5 μg molybdenum,
which are combined into the multivitamin and mineral pre-mixture prior to incorporation into the protein-rich nutritional supplement.

18. The protein-rich nutritional supplement of claim 15, wherein the multivitamin and mineral pre-mixture comprises a mixture of:
a. approximately 5000 IU vitamin A;
b. approximately 400 IU vitamin D;
c. approximately 30 IU vitamin E;
d. approximately 80 μg vitamin K;
e. approximately 60 mg vitamin C;
f approximately 1.5 mg thiamin;
g. approximately 1.7 mg riboflavin;
h. approximately 20 mg niacin;
i. approximately 10 mg pantothenic acid;
j. approximately 2 mg vitamin $B_6$;
k. approximately 6 μg vitamin $B_{12}$;
l. approximately 300 μg biotin;
m. approximately 400 μg folate;
n. approximately 1000 mg calcium;
o. approximately 150 μg iodine;
p. approximately 15 mg zinc;
q. approximately 2 mg copper;
r. approximately 120 μg chromium;
s. approximately 3400 mg chloride;
t. approximately 18 mg iron;
u. approximately 1000 mg phosphorus;
v. approximately 400 mg magnesium;
w. approximately 70 μg selenium;
x. approximately 2 mg manganese; and
y. approximately 75 μg molybdenum, which are combined into the multivitamin and mineral pre-mixture prior to incorporation into the protein-rich nutritional supplement.

19. A method of supplementing the nutritional intake of individuals engaged in bodybuilding and protein supplementation, comprising orally administering the protein-rich nutritional supplement of claim 8.

20. A method of supplementing the nutritional intake of individuals engaged in bodybuilding and meal replacement, comprising orally administering the protein-rich nutritional supplement of claim 9.

21. A method of augmenting the mental acuity and energy of humans, comprising orally administering the protein-rich nutritional supplement of claim 10.

22. A method of supplementing the nutritional intake of women, comprising orally administering the protein-rich nutritional supplement of claim 11.

23. A method of supplementing the nutritional intake of male bodybuilders, comprising orally administering the protein-rich nutritional supplement of claim 12.

24. A method of supplementing the nutritional intake of children and adolescents, comprising orally administering the protein-rich nutritional supplement of claim 13.

25. A method of supplementing the nutritional intake of individuals engaged in bodybuilding and exercise recovery, comprising orally administering the protein-rich nutritional supplement of claim 14.

26. A method of supplementing the nutritional intake of individuals engaged in bodybuilding and mass gaining, comprising orally administering the protein-rich nutritional supplement of claim 15.

27. A method of supplementing the nutritional intake of older adults, comprising orally administering the protein-rich nutritional supplement of claim 16.

28. An agglomerated granular protein-rich nutritional supplement comprising:
a plurality of hyperosmotic agglomerated granules that are rapidly dissolvable in an aqueous liquid environment and directly absorbable onto the tongue of a user to facilitate and increase rapid absorption in the bloodstream, each granule comprising a mixture of:
at least about 13 percent to about 100 percent by weight edible nutritional food proteins;
edible amino acids, the edible amino acids comprising up to about 78 percent by weight of the granule;
from about 0.2 percent to about 9 percent by weight edible plant extracts provided as a nutrition source;
an effervescing compound in an amount sufficient to give rise to a gentle effervescence of the supplement on the tongue; and
a flavoring compound.

29. An agglomerated granular protein-rich nutritional supplement comprising:
a plurality of hyperosmotic agglomerated granules, each granule having a sufficiently small size that the granule can be placed on the tongue of a user and absorbed thereby, each granule comprising:
an agglomerated core comprising a nutritional supplement formulation of:
at least about 13 percent by weight edible nutritional food proteins; and
edible amino acids, the edible amino acids comprising up to about 78 percent by weight of the granule; and
a coating sprayed on the core, the coating comprising an effervescing compound and a flavoring compound, the effervescing compound increasing the rate of dissolvability of the granule in an aqueous liquid environment.

* * * * *

UNITED STATES PATENT AND TRADEMARK OFFICE
CERTIFICATE OF CORRECTION

PATENT NO. : 7,445,807 B2
APPLICATION NO. : 10/271239
DATED : November 25, 2008
INVENTOR(S) : Larsen Page 1 of 1

It is certified that error appears in the above-identified patent and that said Letters Patent is hereby corrected as shown below:

In claim 1, line 20, the following word should be corrected as follows:
"perform" to "preform"

In claim 6, line 5 should be corrected to include a comma as follows:
chronous operation of said preform conditioner, conveyor In claim 9, line 2, the following word should be corrected as follows:
"perform" to "preform"

In claim 12, section (c), line 4, the following word should be corrected as follows:
"perform" to "preform"

Signed and Sealed this

Seventeenth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,445,807 B2  Page 1 of 1
APPLICATION NO. : 10/271239
DATED : November 4, 2008
INVENTOR(S) : Christopher Lockwood It is certified that error appears in the above-identified patent and that said Letters Patent is hereby corrected as shown below:

This certificate supersedes the Certificate of Correction issued March 17, 2009. The certificate should be vacated since no Certificate of Correction was granted for this patent number.

Signed and Sealed this

Seventh Day of April, 2009

JOHN DOLL
*Acting Director of the United States Patent and Trademark Office*